United States Patent
Urata

(10) Patent No.: US 12,552,019 B2
(45) Date of Patent: Feb. 17, 2026

(54) MACHINE LEARNING METHOD AND ROBOT SYSTEM

(71) Applicant: YAMAHA HATSUDOKI KABUSHIKI KAISHA, Iwata (JP)

(72) Inventor: Satoshi Urata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 295 days.

(21) Appl. No.: 17/995,673

(22) PCT Filed: Apr. 28, 2020

(86) PCT No.: PCT/JP2020/018091
§ 371 (c)(1),
(2) Date: Oct. 6, 2022

(87) PCT Pub. No.: WO2021/220394
PCT Pub. Date: Nov. 4, 2021

(65) Prior Publication Data
US 2023/0158667 A1    May 25, 2023

(51) Int. Cl.
*G06N 20/00* (2019.01)
*B25J 9/16* (2006.01)

(52) U.S. Cl.
CPC .......... *B25J 9/1612* (2013.01); *B25J 9/163* (2013.01); *G06N 20/00* (2019.01)

(58) Field of Classification Search
CPC .......... B25J 9/1612; B25J 9/163; G06N 20/00
See application file for complete search history.

(56) References Cited

U.S. PATENT DOCUMENTS

| 9,802,317 B1 * | 10/2017 | Watts ................... G05B 19/402 |
| 2011/0265311 A1 | 11/2011 | Kondo et al. |
| 2013/0054025 A1 | 2/2013 | Ito |

(Continued)

FOREIGN PATENT DOCUMENTS

| CN | 108778636 A | 11/2018 |
| CN | 210150279 U | 3/2020 |
| CN | 112025701 A | 12/2020 |

(Continued)

OTHER PUBLICATIONS

Cambridge-Webster definition for "adapt" as accessed Feb. 12, 2025: https://dictionary.cambridge.org/dictionary/english/adapt#google_vignette (Year: 2025).*

(Continued)

*Primary Examiner* — Wade Miles
*Assistant Examiner* — Aaron G Cain
(74) *Attorney, Agent, or Firm* — Studebaker Brackett PLLC

(57) ABSTRACT

A machine learning method for learning an action of a robot including a hand to pick out a workpiece from a container containing a plurality of the workpieces stacked in bulk and install the workpiece such that the workpiece is in a predetermined installation state includes learning a reverse-order action of removing, by the hand, the workpiece in the predetermined installation state after completion of installation, and learning an installation order of the workpiece based on a learning result of the reverse-order action of removing the workpiece.

15 Claims, 5 Drawing Sheets

(56) References Cited

U.S. PATENT DOCUMENTS

| | | | |
|---|---|---|---|
| 2016/0221187 A1* | 8/2016 | Bradski | .................... B25J 9/162 |
| 2022/0161427 A1 | 5/2022 | Yerazunis et al. | |

FOREIGN PATENT DOCUMENTS

| | | |
|---|---|---|
| DE | 10 2012 022 190 B4 | 2/2019 |
| DE | 102019003868 A1 | 12/2019 |
| DE | 11 2018 007 727 T5 | 2/2021 |
| DE | 11 2019 002 310 T5 | 2/2021 |
| EP | 3486041 A2 | 5/2019 |
| JP | H03-228591 A | 10/1991 |
| JP | 2011-110688 A | 6/2011 |
| JP | 2013-043271 A | 3/2013 |
| JP | 2015-142952 A | 8/2015 |
| JP | 2017-030135 A | 2/2017 |
| JP | 2018-118343 A | 8/2018 |
| WO | 2018/146770 A1 | 8/2018 |
| WO | 2018/210404 A1 | 11/2018 |
| WO | 2019/239563 A1 | 12/2019 |
| WO | 2019/239565 A1 | 12/2019 |

OTHER PUBLICATIONS

An Office Action issued by the German Patent and Trademark Office on Oct. 13, 2023, which corresponds to German Patent Application No. 112020006594.4 and is related to U.S. Appl. No. 17/995,673.

International Search Report issued in PCT/JP2020/018091; mailed Aug. 11, 2020.

Written Opinion issued in PCT/JP2020/018091; mailed Aug. 11, 2020.

An Office Action mailed by China National Intellectual Property Administration on Oct. 17, 2024, which corresponds to Chinese Patent Application No. 202080096331.3 and is related to U.S. Appl. No. 17/995,673; with English language translation.

* cited by examiner

ORDER: 1 | SUCCESS PROBABILITIES OF REVERSE-ORDER ACTIONS
WORKPIECE A: 70%
WORKPIECE B: 50%
WORKPIECE C: 50%
WORKPIECE D: 60%

SINCE SUCCESS PROBABILITIES ARE LOW, PLEASE REVIEW HAND OR JIG PALLET.

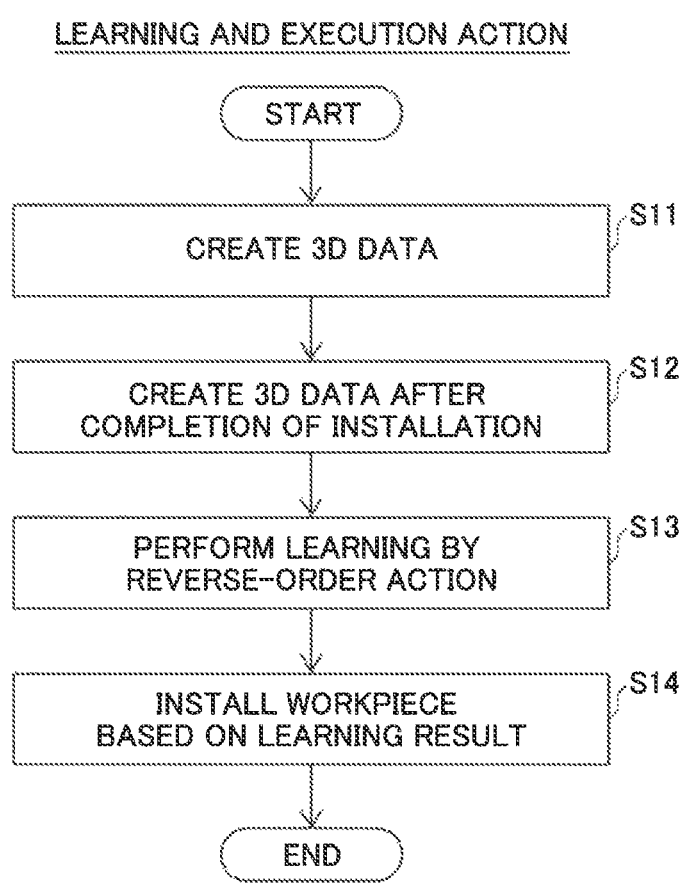

MACHINE LEARNING METHOD AND ROBOT SYSTEM

CROSS-REFERENCE TO RELATED APPLICATION

This application is a National Stage of International Patent Application No. PCT/JP2020/018091, filed Apr. 28, 2020, the entire content of which is incorporated herein by reference.

BACKGROUND

Technical Field

The present disclosure relates to a machine learning method and a robot system, and more particularly, it relates to a machine learning method for learning actions of a robot picking out a workpiece from a container containing a plurality of workpieces stacked in bulk with its hand and installing the picked out workpiece with its hand and a robot system that learns the actions of the robot.

Background Art

Conventionally, a machine learning method for learning actions of a robot picking out a workpiece from a container containing a plurality of workpieces stacked in bulk with its hand and installing the picked out workpiece with its hand is known. Such a method is disclosed in Japanese Patent Laid-Open No. 2017-030135, for example.

Japanese Patent Laid-Open No. 2017-030135 discloses a machine learning method for learning actions of a robot picking out a workpiece from a container containing a plurality of workpieces stacked in bulk with its hand and installing the picked out workpiece on a conveyor or a workbench with its hand. In this machine learning method, an optimum action to pick out the workpiece from the container with the hand is learned.

SUMMARY

In the machine learning method described in Japanese Patent Laid-Open No. 2017-030135, although the optimum action to pick out the workpiece from the container with the hand is learned, an action of installing (placing) the workpiece with the hand is not considered. Therefore, the workpiece picked out with the hand may be re-held. Consequently, it is difficult to improve the efficiency of installation work performed after the workpiece is picked out.

The present disclosure provides a machine learning method and a robot system each capable of improving the efficiency of installation work performed after a workpiece is picked out.

A machine learning method according to a first aspect of the present disclosure is for learning an action of a robot including a hand to pick out a workpiece from a container containing a plurality of the workpieces stacked in bulk and install the workpiece such that the workpiece is in a predetermined installation state, and includes learning a reverse-order action of removing, by the hand, the workpiece in the predetermined installation state after completion of installation, and learning an installation order of the workpiece based on a learning result of the reverse-order action of removing the workpiece.

The machine learning method according to the first aspect of the present disclosure includes the learning of the reverse-order action of removing, by the hand, the workpiece in the predetermined installation state after completion of installation and the learning of the installation order of the workpiece based on the learning result of the reverse-order action of removing the workpiece. Accordingly, the installation order of the workpiece can be determined with consideration of the action of installing the picked put workpiece. Consequently, it is possible to significantly reduce or prevent re-holding of the workpiece picked out by the hand. That is, the workpiece picked out by the hand can be directly installed (placed) without being re-held. Thus, the efficiency of the installation work performed after the workpiece is picked out can be improved.

In the aforementioned machine learning method according to the first aspect, the learning of the reverse-order action of removing the workpiece preferably includes repeating the reverse-order action of removing the workpiece by the hand until all or at least one, but not all, of the workpieces in the predetermined installation state is removed. Accordingly, the reverse-order action of removing the workpiece by the hand is repeated until all or at least one, but not all, of the workpieces in the predetermined installation state is removed such that the reverse-order action on the workpiece can be learned. Consequently, the installation order of the workpiece can be determined with due consideration of the action of installing the picked out workpiece.

In this case, the learning of the reverse-order action of removing the workpiece preferably includes repeating the reverse-order action of removing the workpiece by the hand until all or at least one, but not all, of the workpieces in the predetermined installation state is removed while an order of removing the workpiece is changed. Accordingly, a plurality of installation orders can be learned. Consequently, the number of choices of installation order can be increased, and a highly efficient installation order can be known.

In the aforementioned configuration in which the reverse-order action of removing the workpiece is repeated while the order of removing the workpiece is changed, the learning of the installation order of the workpiece preferably includes learning a plurality of installation orders and learning priorities of the plurality of installation orders based on the learning result of the reverse-order action of removing the workpiece. Accordingly, a highly efficient installation order can be easily selected based on the priorities of the plurality of installation orders. Consequently, the efficiency of the installation work performed after the workpiece is picked out can be easily improved.

In the aforementioned configuration in which the reverse-order action of removing the workpiece is repeated, the learning of the reverse-order action of removing the workpiece preferably includes repeating the reverse-order action of removing the workpiece by the hand until all or at least one, but not all, of the workpieces in the predetermined installation state is removed in a state in which a portion of an order of removing the workpiece has been set. Accordingly, the order of removing the workpiece can be limited by the amount corresponding to the set portion of the order of removing the workpiece. Consequently, the order of removing the workpiece is limited such that the time required for learning can be shortened.

The aforementioned machine learning method according to the first aspect preferably further includes learning a holding position of the workpiece held by the hand based on the learning result of the reverse-order action of removing the workpiece. Accordingly, the holding position of the workpiece can be determined with consideration of the action of installing the workpiece. Consequently, it is possible to further significantly reduce or prevent re-holding of the workpiece picked out by the hand. Thus, the efficiency of the installation work performed after the workpiece is picked out can be further improved.

In this case, the learning of the holding position of the workpiece preferably includes learning the holding position of the workpiece with consideration of a constraint condition including at least one of a holding prohibited portion of the workpiece or an obstacle in a vicinity of the workpiece. Accordingly, a position at which the holding prohibited portion of the workpiece and the obstacle in the vicinity of the workpiece, for example, are avoidable can be learned as the holding position of the workpiece. Consequently, an appropriate holding position of the workpiece can be learned.

The aforementioned machine learning method according to the first aspect preferably further includes notifying a user of a review of at least one of the hand or a jig pallet on which the workpiece is installed, based on a success probability of the reverse-order action of removing the workpiece. Accordingly, the user can review the hand and the jig pallet on which the workpiece is installed, for example. Consequently, it is possible to significantly reduce or prevent the continuous use of the inappropriate hand and the inappropriate jig pallet on which the workpiece is installed.

In the aforementioned machine learning method according to the first aspect, the learning of the reverse-order action of removing the workpiece preferably includes learning a reverse-order action of removing a plurality of types of the workpieces by the hand. Accordingly, even when the plurality of types of workpieces are handled, the efficiency of the installation work performed after the workpiece is picked out can be improved.

A robot system according to a second aspect of the present disclosure includes a robot including a hand to pick out a workpiece from a container containing a plurality of the workpieces stacked in bulk and install the workpiece such that the workpiece is in a predetermined installation state, a machine learning device configured to learn an action of the robot, and a controller configured or programmed to control the action of the robot based on a learning result of the machine learning device. The machine learning device is configured to learn a reverse-order action of removing, by the hand, the workpiece in the predetermined installation state after completion of installation, and learn an installation order of the workpiece based on a learning result of the reverse-order action of removing the workpiece.

In the robot system according to the second aspect of the present disclosure, the machine learning device is configured to learn the reverse-order action of removing, by the hand, the workpiece in the predetermined installation state after completion of installation and learn the installation order of the workpiece based on the learning result of the reverse-order action of removing the workpiece. Accordingly, the efficiency of the installation work performed after the workpiece is picked out can be improved, similarly to the aforementioned machine learning method according to the first aspect.

In the aforementioned robot system according to the second aspect, the machine learning device is preferably configured to learn a holding position of the workpiece held by the hand based on the learning result of the reverse-order action of removing the workpiece. Accordingly, the holding position of the workpiece can be determined with consideration of the action of installing the workpiece. Consequently, it is possible to further significantly reduce or prevent re-holding of the workpiece picked out by the hand. Thus, the efficiency of the installation work performed after the workpiece is picked out can be further improved.

In this case, the machine learning device is preferably configured to select the holding position of the workpiece that allows the workpiece to be picked out from the container and allows the workpiece to be installed. Accordingly, it is possible to reliably significantly reduce or prevent re-holding of the workpiece picked out by the hand. Thus, the efficiency of the installation work performed after the workpiece is picked out can be reliably improved.

In the aforementioned configuration in which the holding position of the workpiece that allows the workpiece to be picked out from the container and allows the workpiece to be installed is selected, the machine learning device is preferably configured to extract the holding position of the workpiece that allows the workpiece to be picked out from the container based on a success probability of picking out the workpiece, and extract the holding position of the workpiece that allows the workpiece to be installed based on a success probability of installing the workpiece. Accordingly, the holding position of the workpiece that allows the workpiece to be picked out from the container and allows the workpiece to be installed can be easily extracted.

According to the present disclosure, as described above, it is possible to provide the machine learning method and the robot system each capable of improving the efficiency of the installation work performed after the workpiece is picked out.

BRIEF DESCRIPTION OF THE DRAWINGS

FIG. 8 is a flowchart for illustrating learning and execution action according to the embodiment of the present disclosure.

DETAILED DESCRIPTION

Figure 1:
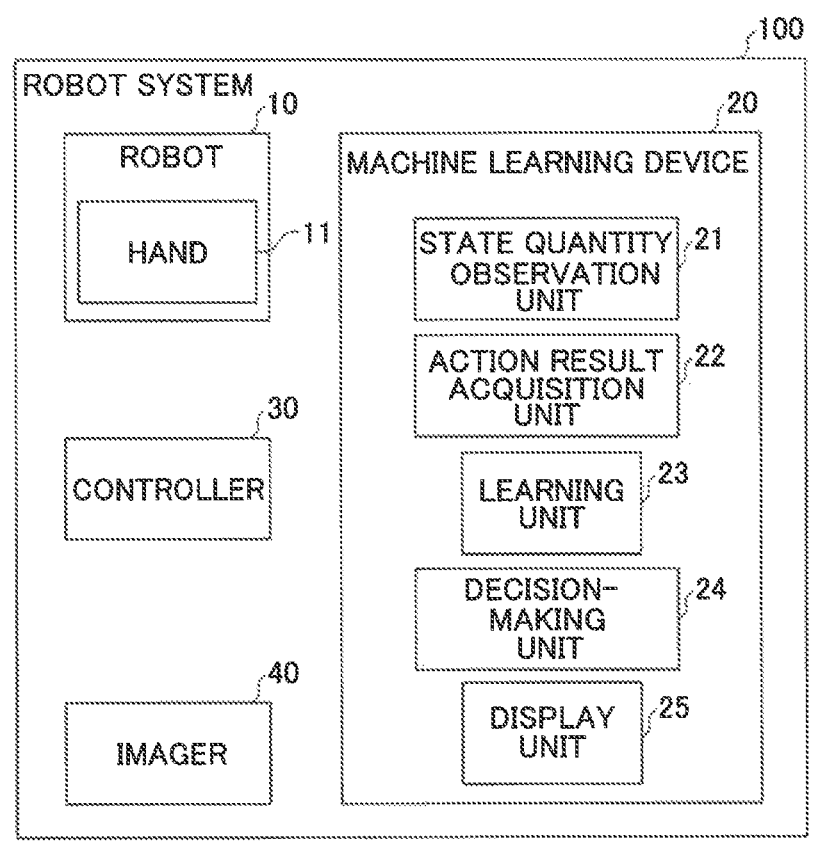
FIG. 1 is block diagram showing a robot system according to an embodiment of the present disclosure.

An embodiment embodying the present disclosure is hereinafter described on the basis of the drawings.

The configuration of a robot system 100 according to the embodiment of the present disclosure is now described with reference to FIG. 1.

Configuration of Robot System

The robot system 100 according to this embodiment picks out a workpiece W from a container (bin) C containing a plurality of workpieces W stacked in bulk, and installs the workpiece W on a jig pallet P1 such that the workpiece W is in a predetermined installation state S. The workpieces W are not particularly limited, but are small components such as screws and nuts. As shown in FIG. 1, the robot system 100 includes a robot 10, a machine learning device 20, a controller 30, and an imager 40.

Figure 2:
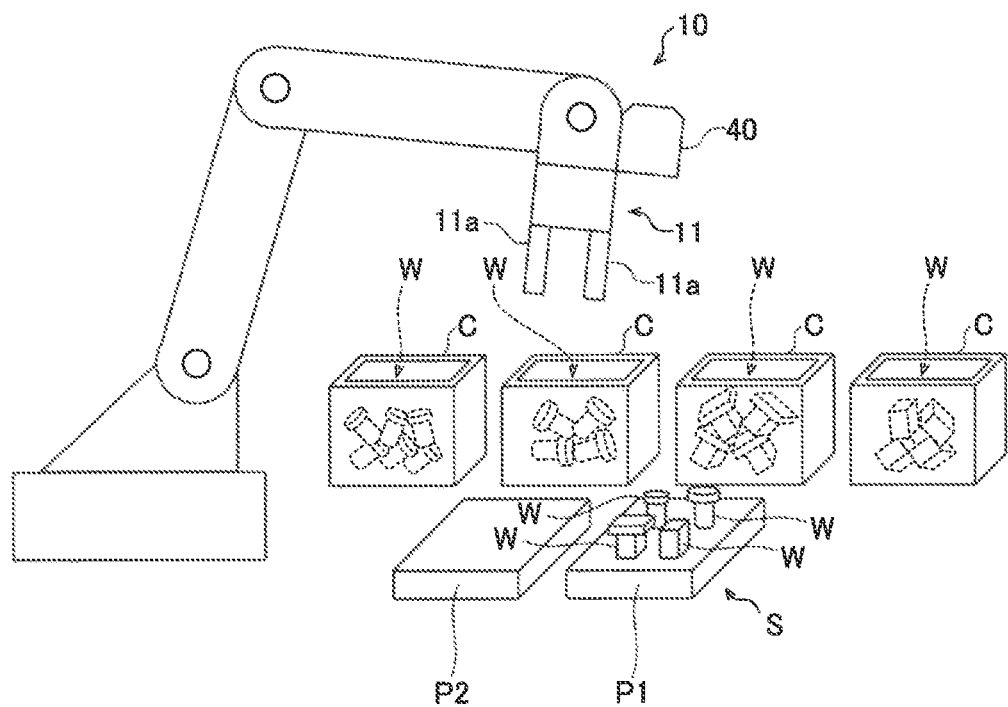
FIG. 2 is a schematic view for illustrating installation of workpieces by a robot according to the embodiment of the present disclosure.

As shown in FIG. 2, the robot 10 is a robot arm that performs work on the workpiece W. Specifically, the robot 10 is a vertical articulated robot. The robot 10 includes a hand (end effector) 11. The hand 11 picks out the workpiece W from the container C and installs the picked out workpiece W on the jig pallet P1. The hand 11 repeatedly picks out the workpiece W from the container C and installs the picked out workpiece W on the jig pallet P1 to install the workpiece W on the jig pallet P1 such that the workpiece W is in the predetermined installation state S. The hand 11 includes a plurality of claws 11a to hold (grasp) the workpiece W.

As shown in FIG. 1, the machine learning device 20 learns (machine learns) actions of the robot 10. Specifically, the machine learning device 20 is a personal computer including a processor and a memory. Machine learning performed by the machine learning device 20 is not particularly limited, but may be supervised learning, unsupervised learning, or reinforcement learning, for example. In this embodiment, reinforcement learning is employed as the machine learning performed by the machine learning device 20.

The machine learning device 20 includes a state quantity observation unit 21, an action result acquisition unit 22, a learning unit 23, a decision-making unit 24, and a display unit 25. The state quantity observation unit 21, the action result acquisition unit 22, the learning unit 23, and the decision-making unit 24 are illustrated as software functional blocks. The state quantity observation unit 21, the action result acquisition unit 22, the learning unit 23, and the decision-making unit 24 may be configured by one hardware circuit (such as a GPU (graphics processing unit) or a plurality of hardware circuits.

The state quantity observation unit 21 observes the state quantity of the robot 10 and the workpiece W. Specifically, the state quantity observation unit 21 observes the state quantity of the robot 10 and the workpiece W based on output data from the imager 40. The state quantity observed by the state quantity observation unit 21 includes the position of the hand 11, the posture of the hand 11, the position of the workpiece W, etc., for example. The action result acquisition unit 22 acquires the action result of the robot 10. Specifically, the action result acquisition unit 22 acquires the action result of the robot 10 based on the output data from the imager 40. The action result acquired by the action result acquisition unit 22 includes the action result of a reverse-order action (described below) of removing the workpiece W by the hand 11, etc., for example.

The learning unit 23 learns the actions of the robot 10. Specifically, the learning unit 23 learns the actions of the robot 10 based on the observation result of the state quantity observation unit 21 and the acquisition result of the action result acquisition unit 22. The learning of the learning unit 23 is described below in detail. The decision-making unit 24 determines an action of the robot 10. Specifically, the decision-making unit 24 determines the action of the robot 10 based on the learning result of the learning unit 23. The display unit 25 displays a setting screen, a notification screen, etc. The display unit 25 is a liquid crystal display including a liquid crystal panel, for example.

The controller 30 includes a control circuit that controls the actions of the robot 10. Specifically, the controller 30 controls the actions of the robot 10 based on the learning result of the machine learning device 20. The controller 30 controls movements of joints and the hand 11 of the robot 10 based on output data from the decision-making unit 24. Furthermore, the controller 30 controls operation of the imager 40.

The imager 40 includes a camera that images the robot 10 and the workpiece W, for example. The imager 40 is provided as a three-dimensional data acquisition device to acquire three-dimensional data including three-dimensional position information of the robot 10 and the workpiece W. The imager 40 images the hand 11 and the workpiece W during the reverse-order action (described below) of removing the workpiece W and the hand 11 and the workpiece W during an action of picking out the workpiece W from the container C, for example. As shown in FIG. 2, the imager 40 is arranged at the tip end of an arm of the robot 10 in the vicinity of the hand 11.

Action of Installing Workpiece

An action of installing the workpiece W is now described.

As shown in FIG. 2, the robot 10 performs an action of installing the workpiece W based on a command from the controller 30 (see FIG. 1). First, the robot 10 performs an action of picking out the workpiece W from the container C with the hand 11. Specifically, the robot 10 performs actions of holding the workpiece W in the container C with the hand 11 and picking out it from the container C.

Then, the robot 10 performs an action of installing the picked out workpiece W on the jig pallet P1 with the hand 11. Specifically, the robot 10 performs actions of moving the workpiece W to a predetermined position of the jig pallet P1 with the hand 11 and installing the workpiece W at the predetermined position of the jig pallet P1.

At this time, when the workpiece W cannot be directly installed on the jig pallet P1 in the posture held in the container C, the robot 10 once installs the workpiece W on a temporary placement pallet P2 with the hand 11 and performs an action of re-holding the workpiece W. The temporary placement pallet P2 serves as a buffer for temporarily placing the workpiece W. The temporary placement pallet P2 is provided in the vicinity of the jig pallet P1.

Then, the robot 10 repeats the action of picking out the workpiece W from the container C with the hand 11 and the action of installing the workpiece W picked out with the hand 11 on the jig pallet P1 until workpieces W on the jig pallet P1 reach the predetermined installation state S. Then, when the workpieces W on the jig pallet P1 reach the predetermined installation state (final state) S, the jig pallet P1 including the workpieces W in the predetermined installation state S is passed to the next process.

FIG. 2 illustrates an example in which four types of workpieces W are installed one by one on the jig pallet P1 for convenience. However, the installation of the workpieces W on the jig pallet P1 is not limited to this example. For example, one type of a plurality of workpieces W may be installed on the jig pallet P1, or a plurality of types of workpieces W other than four types may be installed one by one or plurality by plurality on the jig pallet P1.

Learning of Actions of Robot

Learning of the actions of the robot 10 is now described.

The machine learning device 20 learns actions of the robot 10 suitable for picking out the workpiece W from the container C containing the plurality of workpieces W stacked in bulk and installing the workpiece W on the jig pallet P1 such that the workpiece W is in the predetermined installation state S.

Figure 3:
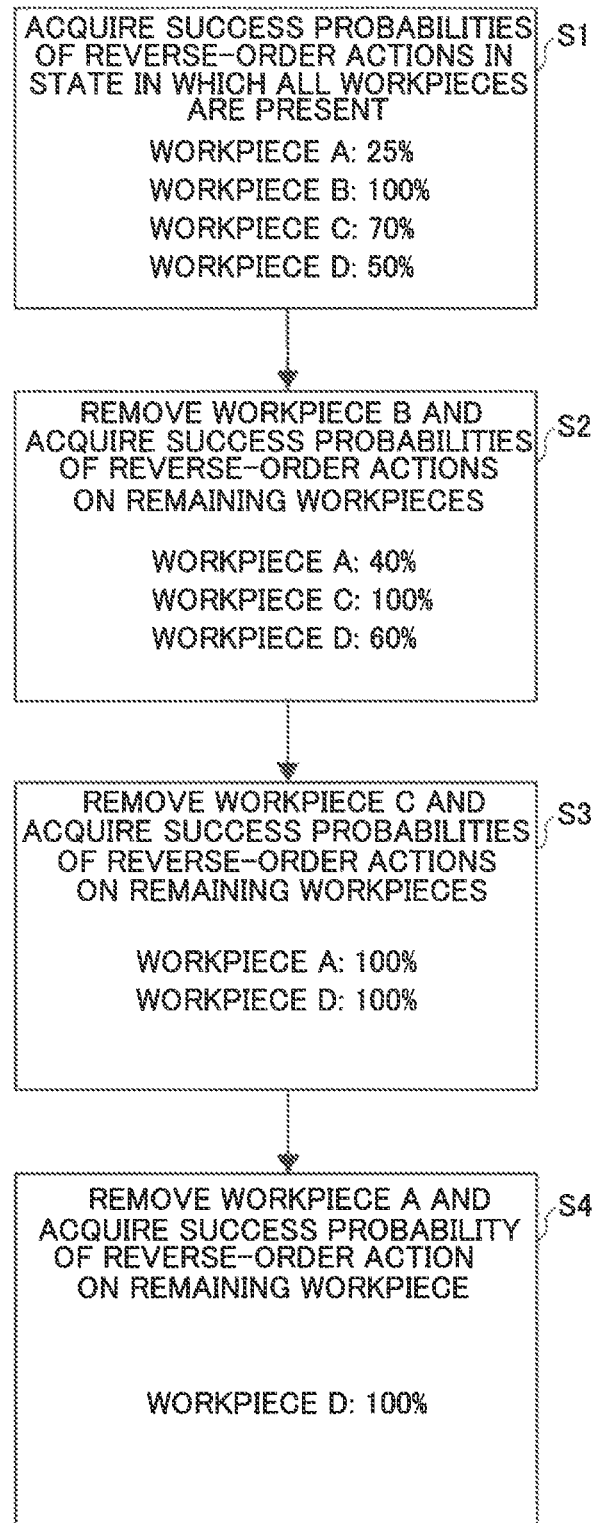
FIG. 3 is a flowchart for illustrating an example of reverse-order actions according to the embodiment of the present disclosure.

In this embodiment, as shown in FIG. 3, the machine learning device 20 learns the reverse-order action of removing, from the jig pallet P1 by the hand 11, the workpiece W in the predetermined installation state (final state) S after completion of installation. When the robot 10 handles a plurality of types of workpieces W, the machine learning device 20 learns reverse-order actions of removing the plurality of types of workpieces W from the jig pallet P1 by the hand 11. When the robot 10 handles one type of workpiece W, the machine learning device 20 learns a reverse-order action of removing one type of workpiece W from the jig pallet P1 by the hand 11.

The machine learning device 20 repeats the reverse-order action of removing the workpiece W from the jig pallet P1 by the hand 11 until all of the workpieces W in the predetermined installation state S are removed. The machine learning device 20 learns the installation order of the workpiece W based on the learning result of the reverse-order action of removing the workpiece W. The reverse-order action of removing the workpiece W from the jig pallet P1 includes an action of holding the workpiece W installed on the jig pallet P1 by the hand 11 and an action of separating the workpiece W held by the hand 11 from the jig pallet P1. The reverse-order action of removing the workpiece W from the jig pallet P1 refers to a reverse action of a forward-order action of installing the workpiece W on the jig pallet P1.

An example of learning the reverse-order action of removing the workpiece W from the jig pallet P1 and learning the installation order based on the learning result of the reverse-order action is now described with reference to FIG. 3. An example in which four workpieces W including a workpiece A, a workpiece B, a workpiece C, and a workpiece D are removed is described.

First, in step S1, the machine learning device 20 acquires the success probability of the reverse-order action for each workpiece W in a state in which all the workpieces W are on the jig pallet P1 (installation state S). That is, the machine learning device 20 acquires the success probabilities of the reverse-order actions on the workpiece A, the workpiece B, the workpiece C, and the workpiece D. The success probability can be acquired by a simulation using three-dimensional data, an actual action of the robot 10, or a combination thereof, for example.

Then, in step S2, the machine learning device 20 removes one workpiece B having a high success probability from the jig pallet P1 by the hand 11, and acquires the success probability of the reverse-order action for each workpiece W in a state in which the remaining three workpieces W (the workpiece A, the workpiece C, and the workpiece D) are on the jig pallet P1. That is, the machine learning device 20 acquires the success probabilities of the reverse-order actions on the workpiece A, the workpiece C, and the workpiece D.

Then, in step S3, the machine learning device 20 removes one workpiece C having a high success probability from the jig pallet P1 by the hand 11, and acquires the success probability of the reverse-order action for each workpiece W in a state in which the remaining two workpieces W (the workpiece A and the workpiece D) are on the jig pallet P1. That is, the machine learning device 20 acquires the success probabilities of the reverse-order actions on the workpiece A and the workpiece D.

Then, in step S4, the machine learning device 20 removes one workpiece A from the jig pallet P1 by the hand 11, and acquires the success probability of the reverse-order action of the last workpiece W in a state in which the last one workpiece W (workpiece D) is on the jig pallet P1. That is, the machine learning device 20 acquires the success probability of the reverse-order action on the workpiece D.

In an example shown in FIG. 3, based on the success probability of the reverse-order action, the workpiece W has been removed from the jig pallet P1 in the order of the workpiece B, the workpiece C, the workpiece A, and the workpiece D. In this case, the machine learning device 20 learns the reverse order as an installation order suitable for installing the workpiece W on the jig pallet P1 such that the workpiece W is in the predetermined installation state S. That is, the machine learning device 20 learns installation of the workpiece W on the jig pallet P1 in the order of the workpiece D, the workpiece A, the workpiece C, and the workpiece B as the installation order suitable for installing the workpiece W on the jig pallet P1 such that the workpiece W is in the predetermined installation state S.

Figure 4:
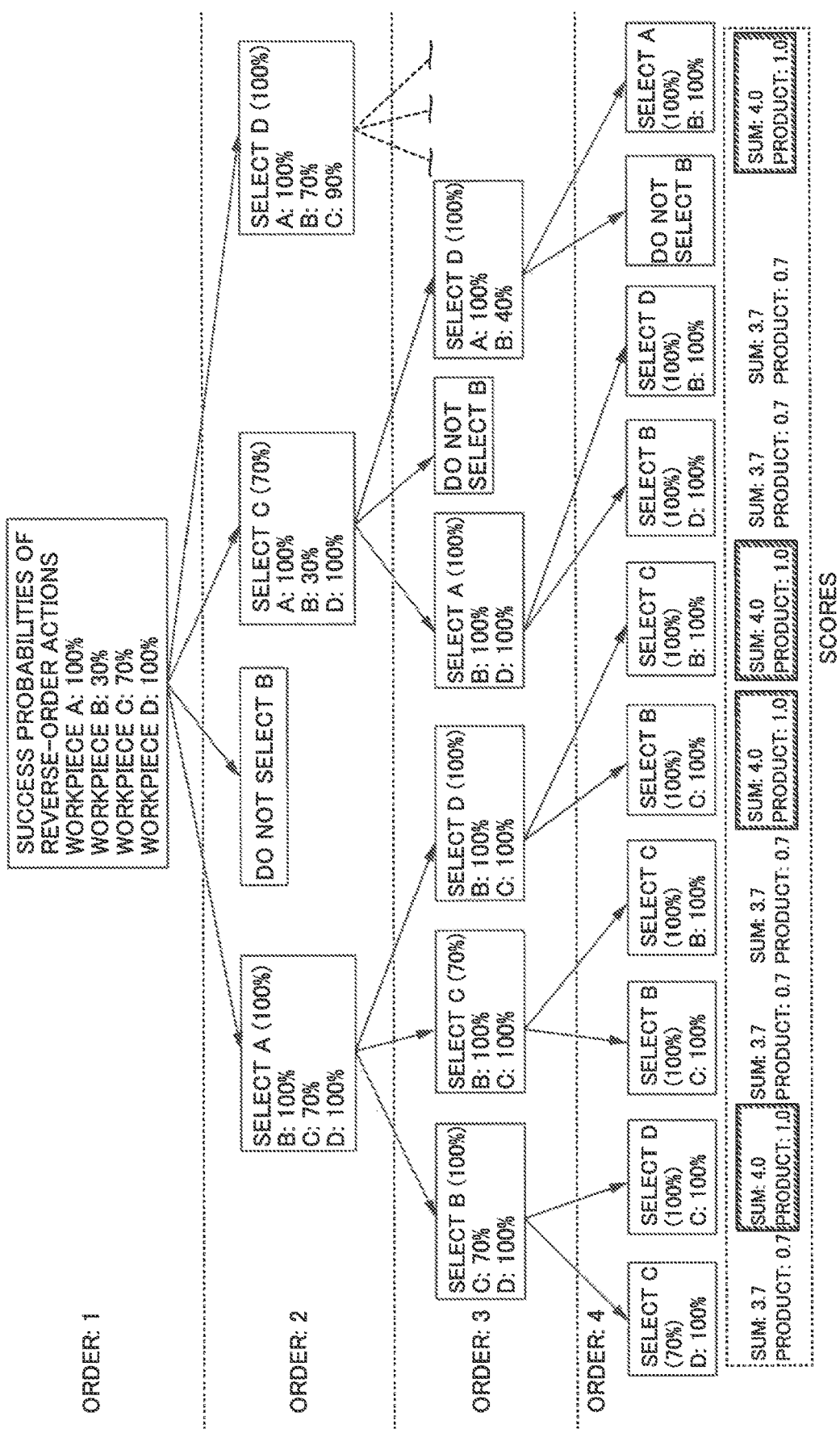
FIG. 4 is a schematic view for illustrating learning of the installation order of the workpieces based on the learning results of the reverse-order actions according to the embodiment of the present disclosure.

Learning of the reverse-order action of removing the workpiece W and learning of the installation order based on the learning result of the reverse-order action are now described in more detail with reference to FIG. 4. Orders 1 to 4 in FIG. 4 correspond to steps S1 to step S4 in FIG. 3, respectively. In FIG. 4, for convenience of illustration, illustration in a case in which the workpiece D is selected in the order 1 is omitted.

As shown in FIG. 4, the machine learning device 20 repeats the reverse-order action of removing the workpiece W from the jig pallet P1 by the hand 11 until all of the workpieces W in the predetermined installation state S are removed while changing the order of removing the workpiece W. At this time, the machine learning device 20 does not learn the workpiece W of which the success probability of the reverse-order action is equal to or less than a threshold. Thus, the efficiency of learning can be improved. The threshold is not particularly limited, but is set to 50% in an example shown in FIG. 4.

In the machine learning device 20, a portion of the order of removing the workpiece W from the jig pallet P1 can be set. In this case, the machine learning device 20 repeats the reverse-order action of removing the workpiece W from the jig pallet P1 by the hand 11 until all of the workpieces W in the predetermined installation state S are removed in a state in which a portion of the order of removing the workpiece W from the jig pallet P1 has been set. The set order may be first, last, or middle, for example. The set order can be specified by a user.

For example, when the workpiece A is set as the workpiece W to be first removed from the jig pallet P1 (i.e., the workpiece W to be last installed on the jig pallet P1), the machine learning device 20 repeats the reverse-order action of removing the workpiece W from the jig pallet P1 by the hand 11 until all of the workpieces W in the predetermined installation state S are removed while satisfying the condition that the workpiece A is first removed from the jig pallet P1. Similarly, when the workpiece B is set as the workpiece W to be last removed from the jig pallet P1 (i.e., the workpiece W to be first installed on the jig pallet P1), the machine learning device 20 repeats the reverse-order action of removing the workpiece W from the jig pallet P1 by the hand 11 until all of the workpieces W in the predetermined installation state S are removed while satisfying the condition that the workpiece B is last removed from the jig pallet P1.

The machine learning device 20 learns a plurality of installation orders and learns the priorities of the plurality of installation orders based on the learning result of the reverse-order action of removing the workpiece W. Specifically, the machine learning device 20 acquires scores of the plurality of installation orders based on the success probability of the reverse-order action, and learns the priorities of the plurality of installation orders based on the acquired scores of the plurality of installation orders. The scores of the installation orders are not particularly limited, but the products and sums of the success probabilities of reverse-order actions in the installation orders can be employed, for example. In this case, the higher the score, the higher the priority. Furthermore, the higher the priority of the installation order, the more suitable the installation order for installing the workpiece W on the jig pallet P1 such that the workpiece W is in the predetermined installation state S.

The machine learning device 20 learns the installation order having the highest priority as a default installation order. In the example shown in FIG. 4, there are a plurality of (four) installation orders having the highest score (highest priority). In this case, the machine learning device 20 learns one of the plurality of installation orders having the highest priority as the default installation order based on the user's specification, for example.

Figures 5, 6, 7:
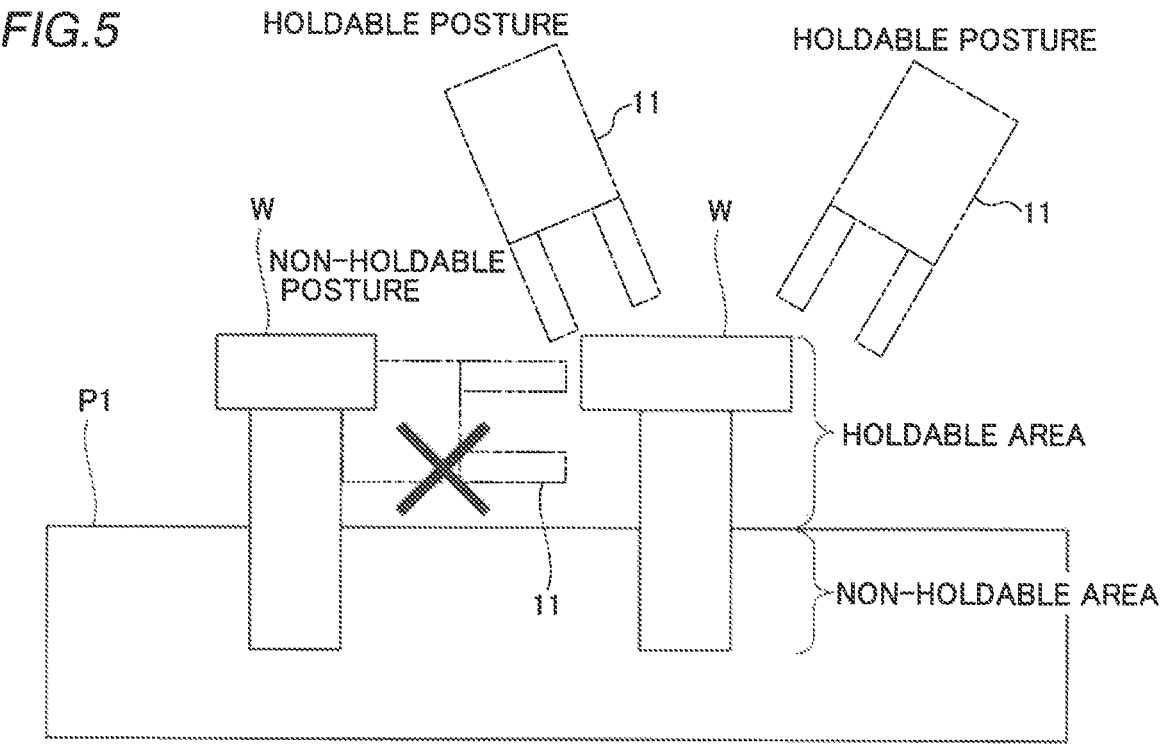
FIG. 5 is a schematic view for illustrating learning of the held position of a workpiece based on the learning result of the reverse-order action according to the embodiment of the present disclosure.
FIG. 6 is a schematic view for illustrating a case in which the success probabilities of the reverse-order actions according to the embodiment of the present disclosure are low.
FIG. 7 is a schematic view for illustrating a notification to a user in a case in which the success probabilities of the reverse-order actions according to the embodiment of the present disclosure are low.

In this embodiment, as shown in FIG. 5, the machine learning device 20 learns the holding position of the workpiece W held by the hand 11 based on the learning result of the reverse-order action of removing the workpiece W from the jig pallet P1. The holding position of the workpiece W held by the hand 11 indicates a concept including the holding position of the workpiece W and the holding posture of the hand 11. That is, learning the holding position of the workpiece W held by the hand 11 refers to learning the holding position of the workpiece W and the holding posture of the hand 11.

Specifically, the machine learning device 20 learns the holding position of the workpiece W, taking into account a constraint condition including a holding prohibited portion of the workpiece W and an obstacle in the vicinity of the workpiece W. Examples of the holding prohibited portion of the workpiece W include a portion of the workpiece W inserted into the jig pallet P1 (a portion that causes the workpiece W to be unable to be installed on the jig pallet P1 when held) and a portion prohibited from being held. Examples of the obstacle in the vicinity of the workpiece W include another workpiece W in the vicinity of the workpiece W and a wall in the vicinity of the workpiece W.

The machine learning device 20 learns the holding position of the workpiece W that can be held by the hand 11 in the reverse-order action and the holding position of the workpiece W that cannot be held by the hand 11 in the reverse-order action based on the learning result of the reverse-order action of removing the workpiece W from the jig pallet P1. In other words, the machine learning device 20 learns the holding position of the workpiece W that can be installed on the jig pallet P1 in the forward-order action and the holding position of the workpiece W that cannot be installed in the forward-order action based on the learning result of the reverse-order action of removing the workpiece W from the jig pallet P1.

In this embodiment, as shown in FIGS. 6 and 7, the machine learning device 20 notifies the user of a review of the hand 11 and the jig palette P1 based on the success probability of the reverse-order action of removing the workpiece W from the jig pallet P1. Specifically, when the workpiece W is first removed from the jig pallet P1, the machine learning device 20 notifies the user of the review of the hand 11 and the jig palette P1 when the success probabilities of the reverse-order actions of all the workpieces W are equal to or less than a threshold. The threshold is not particularly limited, but can be set to 100%, for example. Furthermore, the machine learning device 20 notifies the user of the review of the hand 11 and the jig pallet P1 by displaying a notification on the display unit 25.

Learning and Execution Action

The learning and execution action by the robot system 100 are now described based on a flowchart with reference to FIG. 8. An example of learning by simulation using three-dimensional data is described.

As shown in FIG. 8, first, in step S11, three-dimensional data is created. Specifically, three-dimensional data of the workpiece W, the hand 11, and the jig pallet P1 with no workpiece W installed is created. The creation of the three-dimensional data is not particularly limited, but can be performed by reading CAD data or measuring the shape with a three-dimensional shape measuring device, for example. As the three-dimensional shape measuring device, a dedicated measuring device may be prepared, or the imager 40 of the robot system 100 may be used.

Then, in step S12, three-dimensional data of the jig pallet P1 after completion of installation of the workpiece W is created. That is, three-dimensional data of the jig pallet P1 with the workpieces W installed in the installation state S is created. The creation of the three-dimensional data can be performed by reading CAD data or measuring the shape with a three-dimensional shape measuring device, for example, similarly to step S11. Similarly to step S11, the imager 40 of the robot system 100 may be used as the three-dimensional shape measuring device.

Then, in step S13, learning is performed by the reverse-order action of removing the workpiece W from the jig pallet P1. In step S13, as described above, a step of learning the reverse-order action of removing, from the jig pallet P1 by the hand 11, the workpiece W in the predetermined installation state S after completion of installation, a step of learning the installation order of the workpiece W based on the learning result of the reverse-order action of removing the workpiece W from the jig pallet P1, and a step of learning the holding position of the workpiece W based on the learning result of the reverse-order action of removing the workpiece W from the jig pallet P1 are performed. The learning of the reverse-order action, the learning of the installation order, and the learning of the holding position are performed by simulation using the three-dimensional data created in step S11 and step S12.

When learning is performed by actually operating the robot 10 instead of the simulation, the jig pallet P1 with the workpieces W actually installed in the installation state S is prepared. Then, learning is performed by performing the reverse-order action on the prepared jig pallet P1. At this time, the reverse-order action is performed while the imager 40 is capturing an image. Thus, based on the output data from the imager 40, the state quantity observation unit 21 can observe the position of the hand 11, the posture of the hand 11, the position of the workpiece W, etc. in the reverse-order action. Furthermore, based on the output data from the imager 40, the action result acquisition unit 22 can acquire the action result (success or failure) of the reverse-order action of removing the workpiece W by the hand 11.

Then, in step S14, the workpiece W is installed based on the learning result of the machine learning device 20. Specifically, in step S14, the hand 11 picks out the workpiece W from the container C and installs the workpiece W on the jig pallet P1 such that the workpiece W is in the predetermined installation state S. At this time, the machine learning device 20 selects the installation order based on the learning result of the reverse-order action. Basically, the machine learning device 20 selects the default installation order as the installation order to be executed. However, when the installation cannot be performed in the default installation order, the machine learning device 20 selects an installation order other than the default installation order among the learned installation orders as the installation order to be executed. In this case, the machine learning device 20 selects, as the installation order to be executed, an installation order having a high priority and in which the installation can be performed among the learned installation orders other than the default installation order.

The machine learning device 20 selects the holding position of the workpiece W held when the workpiece W is picked out from the container C based on the learning result of the reverse-order action and the containing state of the workpiece W in the container C. The containing state of the workpiece W in the container C can be acquired based on the output data from the imager 40, which is obtained by imaging the workpiece W in the container C. The machine learning device 20 selects the holding position of the workpiece W that allows the workpiece W to be picked out from the container C and allows the workpiece W to be installed on the jig pallet P1.

Specifically, the machine learning device 20 extracts the holding position of the workpiece W that allows the workpiece W to be picked out from the container C based on the success probability of picking out the workpiece W, and extracts the holding position of the workpiece W that allows the workpiece W to be installed based on the success probability of installing the workpiece W. The success probability of picking out the workpiece W can be acquired based on the output data from the imager 40, which is obtained by imaging the workpiece W in the container C. The action of picking out the workpiece W from the container C can be learned in advance. The action is learned in advance such that the success probability of picking out the workpiece W can be accurately acquired. The success probability of installing the workpiece W can be acquired based on the success probability of the learned reverse-order action. The machine learning device 20 selects the holding position of the workpiece W that allows the workpiece W to be picked out from the container C and allows the workpiece W to be installed on the jig pallet P1 from among the extracted holding position of the workpiece W that allows the workpiece W to be picked out from the container C and the extracted holding position of the workpiece W that allows the workpiece W to be installed.

The machine learning device 20 transmits the selected information to the controller 30. Then, the controller 30 controls the actions of the robot 10 based on the information from the machine learning device 20. Then, based on a command from the controller 30, the robot 10 picks out the workpiece W from the container C containing the plurality of workpiece W stacked in bulk, and installs the workpiece W on the jig pallet P1 such that the workpiece W is in the predetermined installation state S.

The learning result of the machine learning device 20 may be further corrected based on the result of the forward-order action of picking out the workpiece W from the container C and installing the workpiece W on the jig pallet P1. For example, when the action of picking out the workpiece W from the container C and installing the workpiece W on the jig pallet P1 fails, information on the holding position of the workpiece W based on the learning result of the reverse-order action cab be corrected based on the result of the forward-order action. For example, when the action of picking out the workpiece W from the container C and installing the workpiece W on the jig pallet P1 fails, information on the score (priority) of the installation order based on the learning result of the reverse-order action can be corrected based on the result of the forward-order action.

According to this embodiment, the following advantageous effects are achieved.

According to this embodiment, as described above, the machine learning method includes learning the reverse-order action of removing, by the hand 11, the workpiece W in the predetermined installation state S after completion of installation and learning the installation order of the workpiece W based on the learning result of the reverse-order action of removing the workpiece W. Accordingly, the installation order of the workpiece W can be determined with consideration of the action of installing the picked put workpiece W. Consequently, it is possible to significantly reduce or prevent re-holding of the workpiece W picked out by the hand 11. That is, the workpiece W picked out by the hand 11 can be directly installed (placed) without being re-held. Thus, the efficiency of the installation work performed after the workpiece W is picked out can be improved.

According to this embodiment, as described above, the learning of the reverse-order action of removing the workpiece W includes repeating the reverse-order action of removing the workpiece W by the hand 11 until all or at least one, but not all, of the workpieces W in the predetermined installation state S is removed. Accordingly, the reverse-order action of removing the workpiece W by the hand 11 is repeated until all or at least one, but not all, of the workpieces W in the predetermined installation state S is removed such that the reverse-order action on the workpiece W can be learned. Consequently, the installation order of the workpiece W can be determined with due consideration of the action of installing the picked out workpiece W.

According to this embodiment, as described above, the learning of the reverse-order action of removing the workpiece W includes repeating the reverse-order action of removing the workpiece W by the hand 11 until all or at least one, but not all, of the workpieces W in the predetermined installation state S is removed while the order of removing the workpiece W is changed. Accordingly, a plurality of installation orders can be learned. Consequently, the number of choices of installation order can be increased, and a highly efficient installation order can be known.

According to this embodiment, as described above, the learning of the installation order of the workpiece W includes learning the plurality of installation orders and learning the priorities of the plurality of installation orders based on the learning result of the reverse-order action of removing the workpiece W. Accordingly, a highly efficient installation order can be easily selected based on the priorities of the plurality of installation orders. Consequently, the efficiency of the installation work performed after the workpiece W is picked out can be easily improved.

According to this embodiment, as described above, the learning of the reverse-order action of removing the workpiece W includes repeating the reverse-order action of removing the workpiece W by the hand 11 until all or at least one, but not all, of the workpieces W in the predetermined installation state S is removed in a state in which a portion of the order of removing the workpiece W has been set. Accordingly, the order of removing the workpiece W can be limited by the amount corresponding to the set portion of the order of removing the workpiece W. Consequently, the order of removing the workpiece W is limited such that the time required for learning can be shortened.

According to this embodiment, as described above, the machine learning method includes learning the holding position of the workpiece W held by the hand 11 based on the learning result of the reverse-order action of removing the workpiece W. Accordingly, the holding position of the workpiece W can be determined with consideration of the action of installing the workpiece W. Consequently, it is possible to further significantly reduce or prevent re-holding of the workpiece W picked out by the hand 11. Thus, the efficiency of the installation work performed after the workpiece W is picked out can be further improved.

According to this embodiment, as described above, the learning of the holding position of the workpiece W includes learning the holding position of the workpiece W with consideration of the constraint condition including the holding prohibited portion of the workpiece W and the obstacle in the vicinity of the workpiece W. Accordingly, a position at which the holding prohibited portion of the workpiece W and the obstacle in the vicinity of the workpiece W, for example, are avoidable can be learned as the holding position of the workpiece W. Consequently, an appropriate holding position of the workpiece W can be learned.

According to this embodiment, as described above, the machine learning method includes notifying the user of the review of the hand 11 and the jig pallet P1 on which the workpiece W is installed, based on the success probability of the reverse-order action of removing the workpiece W. Accordingly, the user can review the hand 11 and the jig pallet on which the workpiece W is installed, for example. Consequently, it is possible to significantly reduce or prevent the continuous use of the inappropriate hand 11 and the inappropriate jig pallet on which the workpiece W is installed.

According to this embodiment, as described above, the learning of the reverse-order action of removing the workpiece W includes learning the reverse-order action of removing the plurality of types of workpieces W by the hand 11. Accordingly, even when the plurality of types of workpieces W are handled, the efficiency of the installation work performed after the workpiece W is picked out can be improved.

According to this embodiment, as described above, the machine learning device 20 selects the holding position of the workpiece W that allows the workpiece W to be picked out from the container C and allows the workpiece W to be installed. Accordingly, it is possible to reliably significantly reduce or prevent re-holding of the workpiece W picked out by the hand 11. Thus, the efficiency of the installation work performed after the workpiece W is picked out can be reliably improved.

According to this embodiment, as described above, the machine learning device 20 extracts the holding position of the workpiece W that allows the workpiece W to be picked out from the container C based on the success probability of picking out the workpiece W, and extracts the holding position of the workpiece W that allows the workpiece W to be installed based on the success probability of installing the workpiece W. Accordingly, the holding position of the workpiece W that allows the workpiece W to be picked out from the container C and allows the workpiece W to be installed can be easily extracted.

MODIFIED EXAMPLES

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

For example, while the example in which the workpiece is installed on the jig pallet so as to be in the predetermined installation state has been shown in the aforementioned embodiment, the present disclosure is not restricted to this. In the present disclosure, the workpiece may be installed on an assembly so as to be in a predetermined installation state (assembly state). In this case, the machine learning device learns a reverse-order action of removing the workpiece in the predetermined installation state (assembly state) from the assembly.

While the example in which the robot is a vertical articulated robot has been shown in the aforementioned embodiment, the present disclosure is not restricted to this. In the present disclosure, the robot may be any robot as long as the same can pick out the workpiece from the container and install the picked out workpiece. For example, the robot may be a horizontal articulated robot other than a vertical articulated robot.

While the example in which the imager is provided as a three-dimensional data acquisition device has been shown in the aforementioned embodiment, the present disclosure is not restricted to this. In the present disclosure, a three-dimensional laser scanning device other than the imager may be provided as a three-dimensional data acquisition device, for example.

While the example in which the imager is provided at the tip end of the arm of the robot has been shown in the aforementioned embodiment, the present disclosure is not restricted to this. In the present disclosure, the imager may be provided at a portion other than the robot. For example, a support member that supports the imager may be installed in the vicinity of the workplace of the robot. In this case, the imager is preferably supported by the support member so as to be able to image the robot and the container from above.

While the example in which the hand includes the plurality of claws and grasps the workpiece has been shown in the aforementioned embodiment, the present disclosure is not restricted to this. In the present disclosure, the hand may be of any configuration as long as the same can hold the workpiece. For example, the hand may be configured to suction the workpiece by a negative pressure from a negative pressure generator, or may be configured to attract the workpiece by the magnetic force of an electromagnet.

While the example in which the machine learning device repeats the reverse-order action of removing the workpiece by the hand until all of the workpieces in the predetermined installation state are removed has been shown in the aforementioned embodiment, the present disclosure is not restricted to this. In the present disclosure, the machine learning device may repeat the reverse-order action of removing the workpiece by the hand until at least one, but not all, of the workpieces in the predetermined installed state is removed.

While the example in which the machine learning device does not learn the workpiece of which the success probability of the reverse-order action is equal to or less than the threshold has been shown in the aforementioned embodiment, the present disclosure is not restricted to this. In the present disclosure, the machine learning device may learn all of the workpieces regardless of the success probability of the reverse-order action.

While the example in which a portion of the order of removing the workpiece can be set in the machine learning device has been shown in the aforementioned embodiment, the present disclosure is not restricted to this. In the present disclosure, a portion of the order of removing the workpiece may not be settable in the machine learning device.

While the example in which the machine learning device learns the holding position of the workpiece with consideration of the constraint condition including both the holding prohibited portion of the workpiece and the obstacle in the vicinity of the workpiece has been shown in the aforementioned embodiment, the present disclosure is not restricted to this. In the present disclosure, the machine learning device may learn the holding position of the workpiece with consideration of a constraint condition including only one of the holding prohibited portion of the workpiece and the obstacle in the vicinity of the workpiece.

While the example in which the machine learning device notifies the user of the review of both the hand and the jig pallet based on the success probability of the reverse-order action of removing the workpiece has been shown in the aforementioned embodiment, the present disclosure is not restricted to this. In the present disclosure, the machine learning device may notify the user of a review of only one of the hand and the jig pallet based on the success probability of the reverse-order action of removing the workpiece.

What is claimed is:

1. A machine learning method for learning an action of a robot including a hand to pick out two or more workpieces from a container containing a plurality of the workpieces stacked in bulk and install the two or more workpieces such that the two or more workpieces are in a predetermined installation state, the machine learning method comprising:
   learning a reverse-order action of removing, by the hand, the two or more workpieces in the predetermined installation state after completion of installation; and
   learning an installation order of the two or more workpieces based on a learning result of the reverse-order action of removing the two or more workpieces, wherein
   the learning of the reverse-order action of removing the two or more workpieces includes repeating the reverse-order action of removing the two or more workpieces by the hand until all or at least one, but not all, of the two or more workpieces in the predetermined installation state is removed,
   the learning of the reverse-order action of removing the two or more workpieces further includes changing an order of removing each of the two or more workpieces in the predetermined installation state and repeating the reverse-order action by the hand according to the changed order until all or at least one, but not all, of the two or more workpieces in the predetermined installation state is removed, and
   the learning of the reverse-order action of removing the two or more workpieces includes learning a plurality of reverse-order actions in which the order of removing each of the two or more workpieces is changed to be different from each other.

2. The machine learning method according to claim 1, wherein the learning of the installation order of the two or more workpieces includes learning both a plurality of installation orders and priorities of the plurality of installation orders based on the learning result of the reverse-order action of removing the two or more workpieces.

3. The machine learning method according to claim 1, wherein the learning of the reverse-order action of removing the two or more workpieces includes repeating the reverse-order action of removing the two or more workpieces by the hand until all or at least one, but not all, of the two or more workpieces in the predetermined installation state is removed in a state in which a portion of the order of removing each of the two or more workpieces has been set.

4. The machine learning method according to claim 1, further comprising:
   learning a holding position of each of the two or more workpieces held by the hand based on the learning result of the reverse-order action of removing the two or more workpieces.

5. The machine learning method according to claim 4, wherein the learning of the holding position of each of the two or more workpieces includes learning the holding position of each of the two or more workpieces with consideration of a constraint condition including at least one of a holding prohibited portion of each of the two or more workpieces or an obstacle in a vicinity of each of the two or more workpieces.

6. The machine learning method according to claim 1, further comprising:
   notifying a user of a review of at least one of the hand or a jig pallet on which the two or more workpieces is installed, based on a success probability of the reverse-order action of removing the two or more workpieces.

7. The machine learning method according to claim 1, wherein the learning of the reverse-order action of removing the two or more workpieces includes learning a reverse-order action of removing a plurality of types of the workpieces by the hand.

8. A robot system comprising:
   a robot including a hand to pick out two or more workpieces from a container containing a plurality of the workpieces stacked in bulk and install the two or more workpieces such that the two or more workpieces are in a predetermined installation state;
   a machine learning device configured to learn an action of the robot; and
   a controller configured or programmed to control the action of the robot based on a learning result of the machine learning device; wherein
   the machine learning device is configured to learn a reverse-order action of removing, by the hand, the two or more workpieces in the predetermined installation state after completion of installation, and learn an installation order of the two or more workpieces based on a learning result of the reverse-order action of removing the two or more workpieces,
   the machine learning device is configured to repeat the reverse-order action of removing the two or more workpieces by the hand until all or at least one, but not all, of the two or more workpieces in the predetermined installation state is removed,
   the machine learning device is configured to change an order of removing each of the two or more workpieces in the predetermined installation state and repeat the reverse-order action by the hand according to the changed order until all or at least one, but not all, of the two or more workpieces in the predetermined installation state is removed, and
   the machine learning device is configured to learn the reverse-order action of removing the two or more workpieces by learning a plurality of reverse-order actions in which the order of removing each of the two or more workpieces is changed to be different from each other.

9. The robot system according to claim 8, wherein the machine learning device is configured to learn a holding position of each of the two or more workpieces held by the hand based on the learning result of the reverse-order action of removing the two or more workpieces.

10. The robot system according to claim 9, wherein the machine learning device is configured to select the holding position of each of the two or more workpieces that allows the two or more workpieces to be picked out from the container and allows the two or more workpieces to be installed.

11. The robot system according to claim 10, wherein the machine learning device is configured to extract the holding position of each of the two or more workpieces that allows the two or more workpieces to be picked out from the container based on a success probability of picking out the two or more workpieces, and extract the holding position of each of the two or more workpieces that allows the two or more workpieces to be installed based on a success probability of installing the workpiece.

12. The machine learning method according to claim 1, wherein the learning of the reverse-order action of removing the two or more workpieces includes repeating the reverse-order action of removing the two or more workpieces by the hand until all or at least one, but not all, of the two or more workpieces in the predetermined installation state is removed in a state in which a portion of the order of removing each of the two or more workpieces has been set.

13. The machine learning method according to claim 2, wherein the learning of the reverse-order action of removing the two or more workpieces includes repeating the reverse-order action of removing the two or more workpieces by the hand until all or at least one, but not all, of the two or more workpieces in the predetermined installation state is removed in a state in which a portion of the order of removing each of the two or more workpieces has been set.

14. The machine learning method according to claim 1, further comprising:
  learning a holding position of each of the two or more workpieces held by the hand based on the learning result of the reverse-order action of removing the two or more workpieces.

15. The machine learning method according to claim 1, further comprising:
  notifying a user of a review of at least one of the hand or a jig pallet on which the two or more workpieces is installed, based on a success probability of the reverse-order action of removing the two or more workpieces.

* * * * *